US011605041B2

(12) United States Patent
Shannon et al.

(10) Patent No.: US 11,605,041 B2
(45) Date of Patent: Mar. 14, 2023

(54) MACHINE LEARNING BASED DECISION MODEL TO OPEN AND CLOSE ENTERPRISE FACILITIES

(71) Applicant: Bank of America Corporation, Charlotte, NC (US)

(72) Inventors: Stephen Shannon, Charlotte, NC (US); James Alexander, Austin, TX (US); Penelope M. York, Rockland, ME (US); Elvin Crabbe, Jr., Waxhaw, NC (US); Richard S. Scot, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/993,094

(22) Filed: Aug. 13, 2020

(65) Prior Publication Data

US 2022/0051159 A1 Feb. 17, 2022

(51) Int. Cl.
*G06Q 30/00* (2012.01)
*G06Q 10/0637* (2023.01)
(Continued)

(52) U.S. Cl.
CPC ....... *G06Q 10/06375* (2013.01); *G06N 20/00* (2019.01); *G06Q 10/0639* (2013.01); *G06Q 10/105* (2013.01); *G06Q 10/1095* (2013.01)

(58) Field of Classification Search
CPC ......... G06Q 10/06375; G06Q 10/0639; G06Q 10/105; G06Q 10/1095; G06Q 10/06398;
(Continued)

(56) References Cited

U.S. PATENT DOCUMENTS 7,027,808 B2 4/2006 Wesby
9,465,958 B2 10/2016 Gardner
(Continued)

OTHER PUBLICATIONS

Kundu, Sajib, et al. "Modeling virtualized applications using machine learning techniques." Proceedings of the 8th ACM SIGPLAN/SIGOPS conference on Virtual Execution Environments. 2012. (Year: 2012).*

*Primary Examiner* — Joseph M Waesco
*Assistant Examiner* — Jay-Ming Wang
(74) *Attorney, Agent, or Firm* — Banner & Witcoff, Ltd.

(57) ABSTRACT

Aspects of the disclosure relate to a decision model to open and close enterprise facilities. A computing platform may receive one or more attributes associated with an operation of an enterprise facility. Subsequently, the computing platform may identify, based on the one or more attributes, a business operation rule for the enterprise facility. Then, the computing platform may determine, based on the one or more attributes and the business operation rule, an operational parameter for the enterprise facility. Then, the computing platform may compare the operational parameter to a threshold parameter, where the threshold parameter may be indicative of whether to keep the enterprise facility open for business. Then, the computing platform may, upon a determination that the operational parameter fails to exceed the threshold parameter, determine to temporarily close the enterprise facility. Then, the computing platform may redistribute user traffic to one or more open customer resource facilities.

19 Claims, 5 Drawing Sheets

(51) Int. Cl.
*G06Q 10/105* (2023.01)
*G06N 20/00* (2019.01)
*G06Q 10/1093* (2023.01)
*G06Q 10/0639* (2023.01)

(58) Field of Classification Search
CPC ........ G06Q 10/00; G06Q 10/02; G06Q 10/06; G06Q 10/10; G06Q 30/02; G06N 20/00
See application file for complete search history.

(56) References Cited

U.S. PATENT DOCUMENTS

| | | | |
|---|---|---|---|
| 10,349,234 | B1 | 7/2019 | Rivkin |
| 2001/0046862 | A1 | 11/2001 | Coppinger et al. |
| 2004/0267595 | A1* | 12/2004 | Woodings ...... G06Q 10/063112 705/7.14 |
| 2006/0277307 | A1* | 12/2006 | Bernardin ............ H04L 67/562 709/226 |
| 2007/0087756 | A1* | 4/2007 | Hoffberg .............. G06Q 20/065 455/450 |
| 2012/0078924 | A1* | 3/2012 | Woodings ........ G06Q 10/06311 707/754 |
| 2014/0156686 | A1* | 6/2014 | Woodings ........ G06Q 10/06311 707/756 |
| 2014/0324537 | A1* | 10/2014 | Gilbert ............ G06Q 10/06375 705/7.31 |
| 2017/0149795 | A1 | 5/2017 | Day, II |
| 2018/0049043 | A1* | 2/2018 | Hoffberg ........... G06Q 10/0635 |
| 2018/0089259 | A1* | 3/2018 | James ................. G06F 16/2425 |
| 2018/0089278 | A1* | 3/2018 | Bhattacharjee ... G06F 16/90335 |
| 2018/0089324 | A1* | 3/2018 | Pal ...................... G06F 16/2471 |
| 2018/0146088 | A1 | 5/2018 | Moshir et al. |
| 2019/0095491 | A1* | 3/2019 | Bhattacharjee ......... G06F 16/13 |
| 2020/0210932 | A1* | 7/2020 | Monovich .............. G06N 5/045 |
| 2020/0322703 | A1* | 10/2020 | Bures .................... G06N 20/00 |

* cited by examiner

MACHINE LEARNING BASED DECISION MODEL TO OPEN AND CLOSE ENTERPRISE FACILITIES

BACKGROUND

Aspects of the disclosure relate to deploying machine learning systems to identify when to open or close enterprise facilities. In particular, one or more aspects of the disclosure relate to a machine learning based decision model to open and close enterprise facilities.

Enterprise organizations may utilize various computing infrastructure located at enterprise facilities to provide services to their customers. Such services may be provided at a physical facility or may be provided virtually. Multiple factors may impact a smooth functioning of the enterprise facilities, and such factors may cause the enterprise facilities to be temporarily closed. For example, weather, traffic, public health, transportation, security, and so forth, may impact an operation of an enterprise facility. Many of these factors may evolve rapidly, and a decision to close or open the enterprise facility may need to be made within a very short interval of time. An inability to make a quick decision may adversely impact customer service, and/or the health and security of customers and enterprise employees. Determining resource availability at the enterprise facility, and determining an impact on customers of the enterprise facility, may be of high significance in deciding to close the enterprise facility, and/or to re-open the enterprise facility after a temporary closure. Also, for example, redirecting customers to alternative resources may also be of high significance to the enterprise organization. In many instances, however, it may be challenging to make a quick decision to open or close an enterprise facility based on resource availability, customer needs, and impact factors, while also attempting to optimize the resource utilization, bandwidth utilization, and efficient operations of the computing infrastructure involved in keeping the enterprise facility operationally active.

SUMMARY

Aspects of the disclosure provide effective, efficient, scalable, fast, reliable, and convenient technical solutions that address and overcome the technical problems associated with a decision model to open and close enterprise facilities.

In accordance with one or more embodiments, a computing platform having at least one processor, and memory, may receive, via a computing device, one or more attributes associated with an operation of an enterprise facility. Subsequently, the computing platform may identify, via the computing device and based on the one or more attributes, a business operation rule for the enterprise facility. Then, the computing platform may determine, via the computing device and based on the one or more attributes and the business operation rule, an operational parameter for the enterprise facility. Then, the computing platform may compare, via the computing device, the operational parameter to a threshold parameter, where the threshold parameter may be indicative of whether to keep the enterprise facility open for business. Then, the computing platform may, upon a determination that the operational parameter fails to exceed the threshold parameter, determine, via the computing device, to temporarily close the enterprise facility. Then, the computing platform may redistribute, via the computing device, user traffic to one or more open customer resource facilities.

In some embodiments, the computing platform may receive, via the computing device, one or more additional attributes associated with the operation of the enterprise facility. Then, the computing platform may determine, via the computing device and based on the one or more additional attributes and the business operation rule, a second operational parameter for the enterprise facility. Subsequently, the computing platform may compare, via the computing device, the second operational parameter to the threshold parameter. Then, the computing platform may, upon a determination that the second operational parameter exceeds the threshold parameter, determine, via the computing device, to open the enterprise facility.

In some embodiments, the one or more attributes may include a number of personnel at the enterprise facility, and where the threshold parameter may be an optimal number of the personnel needed to maintain the operation of the enterprise facility.

In some embodiments, the one or more attributes may include an event that may impact the operation of the enterprise facility, and where the threshold parameter may be based on a probability of occurrence of the event.

In some embodiments, the computing platform may identify, from one or more external data sources, the event that may impact the operation of the enterprise facility. Subsequently, the computing platform may determine the operational parameter based on the identified event.

In some embodiments, the computing platform may determine location data of one or more personnel associated with the enterprise facility, where the one or more personnel may be impacted by the event. Then, the computing platform may determine the operational parameter based on the location data of the one or more personnel.

In some embodiments, the event may include one or more of: a weather-related event, a public health related event, a natural disaster related event, a security related event, an availability of internet resources, and availability of utility resources, a traffic related event.

In some embodiments, the one or more attributes may include a volume of customer traffic at the enterprise facility, and where the threshold parameter may be an optimal volume of the customer traffic.

In some embodiments, the one or more attributes may include a volume of transactional activity at the enterprise facility, and where the threshold parameter may be an optimal volume of the transactional activity.

In some embodiments, the one or more open customer resource facilities may include a virtual facility.

In some embodiments, the computing platform may trigger, via the computing device, a business continuity plan for the enterprise facility.

In some embodiments, the computing platform may automatically re-schedule user appointments.

In some embodiments, the computing platform may determine location data of one or more customers associated with the enterprise facility. Then, the computing platform may redistribute the user traffic based on the location data of the one or more customers.

In some embodiments, the computing platform may train, based on historical data associated with opening or closing of enterprise facilities, a machine learning model to determine whether to temporarily close the enterprise facility.

In some embodiments, the computing platform may train, based on historical data associated with opening or closing of enterprise facilities, a machine learning model to redistribute the user traffic to the one or more open customer resource facilities.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
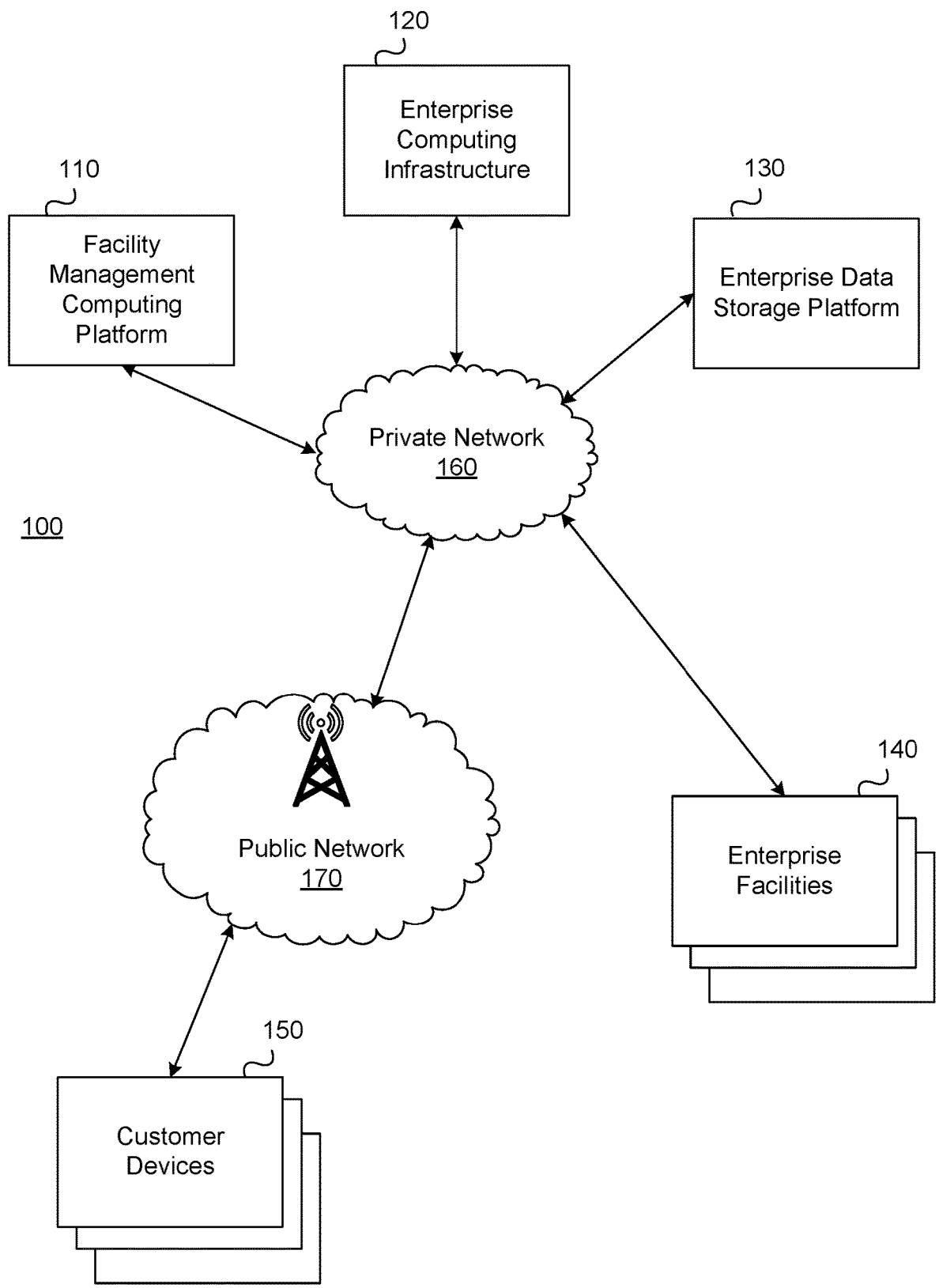
FIGS. 1A and 1B depict an illustrative computing environment for machine learning based decision model to open and close enterprise facilities.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Enterprise organization may provide customer service via various physical and virtual enterprise facilities. For example, a financial institution may have physical locations that provide financial services, such as, for example, banking services, loan services, trading services, and so forth. Also, for example, customer service may be provided virtually via communication channels to communicate with customer service agents. The customer service agents may be located at a call center. Customers may visit the enterprise facility to engage in various activities related to a financial account, a mortgage account, a trading account, fund transfers, and so forth.

In many instances, factors related to weather, traffic, public health, transportation, security, and so forth, may impact an operation of an enterprise facility. For example, a severe thunderstorm may impact an ability of enterprise employees to commute to an enterprise facility. Also, for example, a civic unrest may cause road closures, and impede flow of traffic, thereby impacting the enterprise facility. As another example, a public health or security related event may impact several employees and adversely affect a functioning of the enterprise facility. In such instances, it may be of high significance to an enterprise organization to deploy a rapid reaction decision making model that can provide a time response to affected enterprise facilities, and dynamically direct customers to different locations and/or virtual service offerings.

Accordingly, a real-time decision making model may be configured to analyze data and apply business rules (e.g., configured as logic rules) to make a decision as to whether to open or close an enterprise facility close based on multiple factors that may impact a smooth operation of the enterprise facility, and may redistribute customer traffic with minimal impact to customers. In many instances, alternate enterprise facilities may be available for faster and/or more reliable customer service options. Generally, customers may not be aware of such alternate enterprise facilities that may effectively address the customer query. Redirecting customers to such alternate resources may minimize and/or eliminate potential adverse consequences resulting from closing enterprise facility. Accordingly, it may be of high significance for an enterprise organization to devise a real-time decision making model that analyzes multiple factors to recommend whether to open or close an enterprise facility, and is also capable of redistributing customers to alternate enterprise facilities to optimize effective resolution of customer issues based on available enterprise resources. Also, fast, smooth, and reliable management of customer traffic may impact a customer's well-being, and may therefore be of high significance to the enterprise organization.

Some aspects of the disclosure relate to utilizing machine learning models to analyze multiple factors that determine whether to open or close an enterprise facility, identify and/or deploy relevant available resources, and provide timely and effective ways to redirect customer traffic. Fast information processing, fast data transmission rates, availability of bandwidth, and so forth may be significant factors in such an automated decision making and resource optimization model.

Figure 1B:
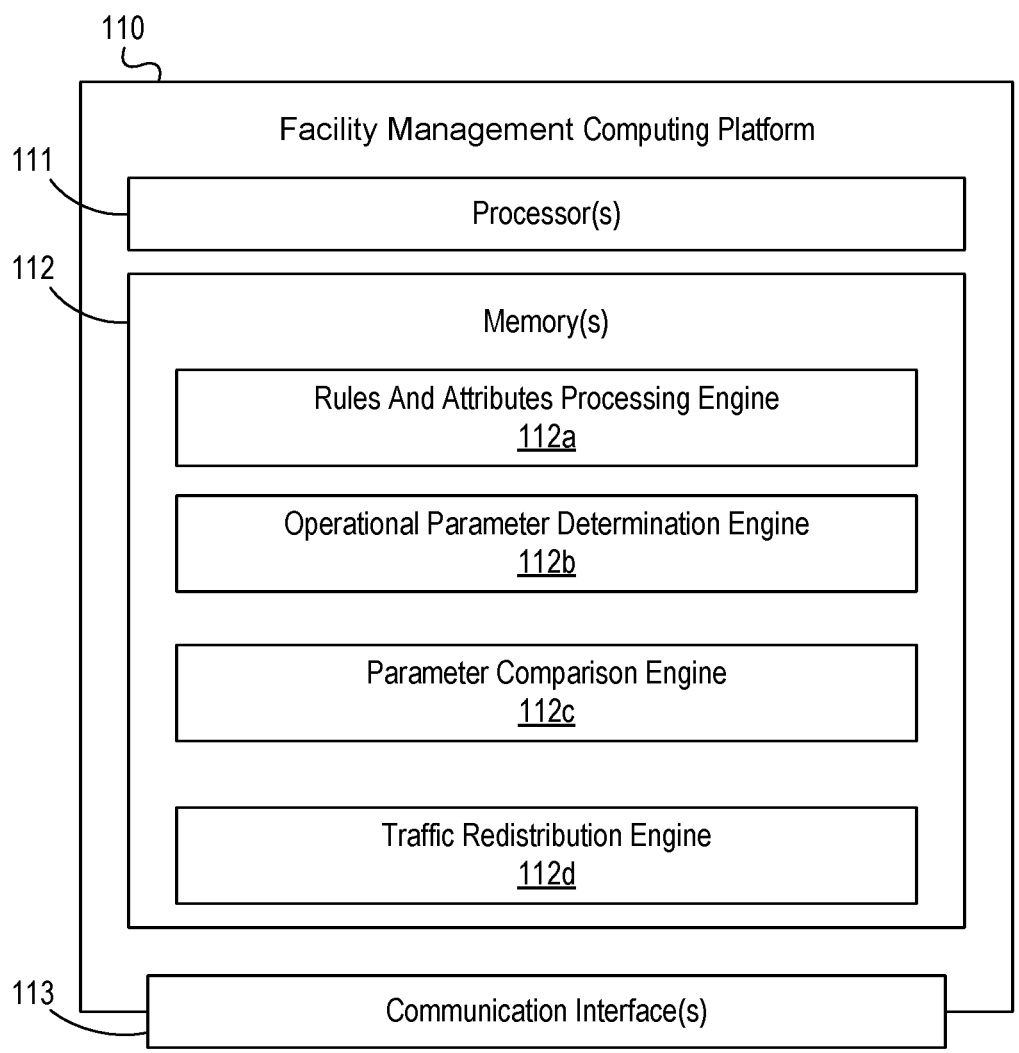

FIGS. 1A and 1B depict an illustrative computing environment for a decision model to open and close enterprise facilities. Referring to FIG. 1A, computing environment 100 may include one or more computer systems. For example, computing environment 100 may include a facility management computing platform 110, enterprise computing infrastructure 120, an enterprise data storage platform 130, enterprise facilities 140, and customer devices 150.

As illustrated in greater detail below, facility management computing platform 110 may include one or more computing devices configured to perform one or more of the functions described herein. For example, facility management computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more enterprise applications. For example, enterprise computing infrastructure 120 may be configured to host, execute, and/or otherwise provide one or more transaction processing programs, an enterprise mobile application for customer devices, loan processing programs, trading programs, and/or other programs associated with an enterprise server. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain account information, such as financial account information including account balances, transaction history, account owner information, and/or other information. In addition, enterprise computing infrastructure 120 may process and/or otherwise execute tasks on specific accounts based on commands and/or other information received from other computer systems included in computing environment 100. Additionally or alternatively, enterprise computing infrastructure 120 may receive instructions from facility management computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain, for enterprise customers, account information, payment information, payment schedules, patterns of activity, product and service offerings, discounts, and so forth. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Enterprise facilities 140 may include one or more facilities of the enterprise organization that hosts enterprise computing infrastructure 120. In some instances, enterprise facilities 140 may include virtual facilities. Generally, enterprise facilities 140 may include one or more computers (e.g., laptop computers, desktop computers, servers, server blades, or the like) and/or other computer components (e.g., processors, memories, communication interfaces). Enterprise facilities 140 may be a platform to provide customer service.

Customer devices 150 may be a personal computing device (e.g., desktop computer, laptop computer) or mobile computing device (e.g., smartphone, tablet, wearable device). In addition, customer devices 150 may be linked to and/or used by a specific user (who may, e.g., be a customer of a financial institution or other organization operating facility management computing platform 110). Also, for example, user of customer devices 150 may use customer devices 150 to perform transactions (e.g., perform banking operations, perform financial transactions, trade financial assets, and so forth) and communicate with a service center to receive responses to user queries.

Computing environment 100 also may include one or more networks, which may interconnect one or more of facility management computing platform 110, enterprise computing infrastructure 120, enterprise data storage platform 130, enterprise facilities 140, and customer devices 150. For example, computing environment 100 may include a private network 160 (which may, e.g., interconnect facility management computing platform 110, enterprise computing infrastructure 120, enterprise data storage platform 130, enterprise facilities 140, and/or one or more other systems which may be associated with an organization, such as a financial institution) and public network 170 (which may, e.g., interconnect customer devices 150 with private network 160 and/or one or more other systems, public networks, sub-networks, and/or the like). Public network 170 may be a high generation cellular network, such as, for example, a 5G or higher cellular network. In some embodiments, private network 160 may likewise be a high generation cellular enterprise network, such as, for example, a 5G or higher cellular network.

In one or more arrangements, enterprise computing infrastructure 120, enterprise data storage platform 130, enterprise facilities 140, customer devices 150, and/or the other systems included in computing environment 100 may be any type of computing device capable of receiving input via a user interface, and communicating the received input to one or more other computing devices. For example, enterprise computing infrastructure 120, enterprise data storage platform 130, enterprise facilities 140, and customer devices 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of facility management computing platform 110, enterprise computing infrastructure 120, enterprise data storage platform 130, enterprise facilities 140, and customer devices 150, may, in some instances, be special-purpose computing devices configured to perform specific functions.

Referring to FIG. 1B, facility management computing platform 110 may include one or more processors 111, memory 112, and communication interface 113. A data bus may interconnect processor 111, memory 112, and communication interface 113. Communication interface 113 may be a network interface configured to support communication between facility management computing platform 110 and one or more networks (e.g., network 150, network 160, a local network, or the like). Memory 112 may include one or more program modules having instructions that when executed by processor 111 cause facility management computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of facility management computing platform 110 and/or by different computing devices that may form and/or otherwise make up facility management computing platform 110. For example, memory 112 may have, store, and/or include a rules and attributes processing engine 112a, an operational parameter determination engine 112b, a parameter comparison engine 112c, and a traffic redistribution engine 112d.

Rules and attributes processing engine 112a may have instructions that direct and/or cause facility management computing platform 110 to receive, via a computing device, one or more attributes associated with an operation of an enterprise facility, as discussed in greater detail below. In some embodiments, rules and attributes processing engine 112a may have instructions that direct and/or cause facility management computing platform 110 to identify, via the computing device and based on the one or more attributes, a business operation rule for the enterprise facility. Operational parameter determination engine 112b may have instructions that direct and/or cause facility management computing platform 110 to determine, via the computing device and based on the one or more attributes and the business operation rule, an operational parameter for the enterprise facility. Parameter comparison engine 112c may have instructions that direct and/or cause facility management computing platform 110 to compare, via the computing device, the operational parameter to a threshold parameter, wherein the threshold parameter is indicative of whether to keep the enterprise facility open for business. In some embodiments, parameter comparison engine 112c may have instructions that direct and/or cause facility management computing platform 110 to upon a determination that the operational parameter fails to exceed the threshold parameter, determine, via the computing device, to temporarily close the enterprise facility. Traffic redistribution engine 112d may have instructions that direct and/or cause facility management computing platform 110 to redistribute, via the computing device, user traffic to one or more open customer resource facilities.

Figure 2A:
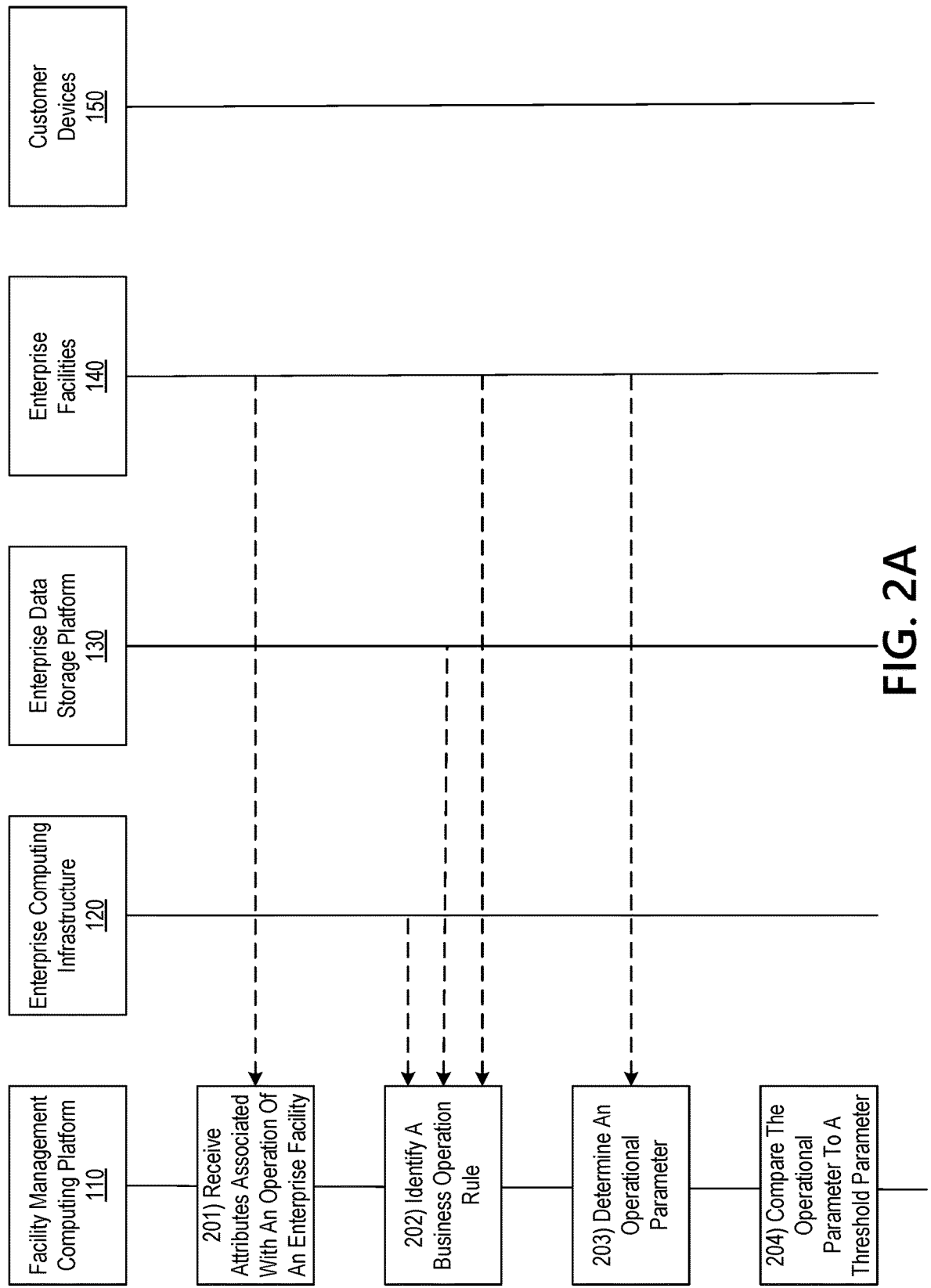
FIGS. 2A and 2B depict an illustrative event sequence for machine learning based decision model to open and close enterprise facilities.
Figure 2B:
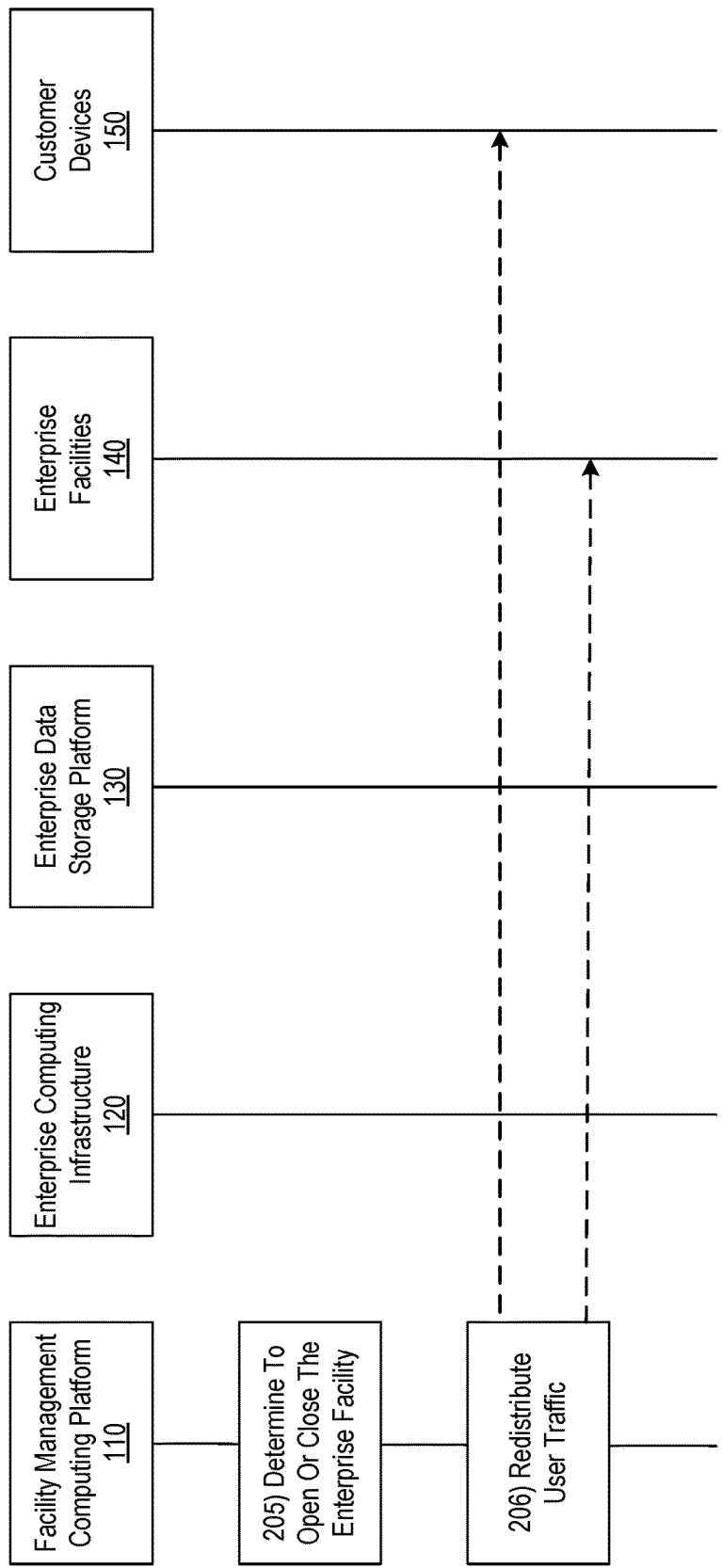

FIGS. 2A and 2B depict an illustrative event sequence for a decision model to open and close enterprise facilities. Referring to FIG. 2A, at step 201, facility management computing platform 110 may receive, via a computing device, one or more attributes associated with an operation of an enterprise facility. An operation of an enterprise facility may depend on multiple factors, such as, for example, factors related to real estate, computing infrastructures, facilities management, operations and management plans, building security, infrastructure security, utilities, human resource, budget, volume of customer traffic, and so forth. Such factors may be associated with one or more attributes.

For example, the one or more attributes may include attributes of parking facilities (e.g., parking in the building, street parking, parking lot, parking garage, nearby parking, and so forth). As another example, the one or more attributes may include accessibility attributes of a physical location (e.g., a number of entrances and exits, public streets in the vicinity of the facility, emergency exits, elevators, and so forth). Also, for example, the one or more attributes may include accessibility to public transportation, utility related resources, a number of employees at the enterprise facility, types of business units at the enterprise facility (e.g., human resources, legal, security, operations, accounting, and so forth), types of employees (e.g., human resource personnel, call center personnel, bank tellers, C-suite executives, and so forth).

In some embodiments, the one or more attributes may include a number of personnel at the enterprise facility. For example, facility management computing platform 110 may determine a number of overall personnel at the enterprise facility. In some embodiments, facility management computing platform 110 may determine a number of employees performing specific functions, such as, for example, information technology infrastructure support personnel, bank tellers, security personnel, mortgage specialists, financial managers, trade experts, and so forth.

In some embodiments, the one or more attributes may include a volume of customer traffic at the enterprise facility. For example, facility management computing platform 110 may determine a number of customers that are serviced by the enterprise facility. In some embodiments, facility management computing platform 110 may determine a number of customers that are serviced for specific functions, such as, for example, bank tellers, mortgage specialists, financial managers, trade experts, and so forth. In some embodiments, the number of customers that are serviced by the enterprise facility may depend on a time of day, a day of the week, or it may be seasonal. Also, for example, number of customers that are serviced by the enterprise facility may depend on accessibility of the enterprise facility, its geographical location, services offered at the enterprise facility, a type of clientele serviced by the enterprise facility (e.g., based on demographics, employment status, education level, and so forth).

In some embodiments, the one or more attributes may include a volume of transactional activity at the enterprise facility. For example, an enterprise facility, such as a financial institution, may perform a number of transactional activities. For example, loans may be processed, deposits may be validated, fund transfer requests may be validated and/or executed, trading portfolios may be managed, trades may be executed via a trading platform, loans may be underwritten, customer accounts may be created, modified, managed, and/or canceled, and so forth. Accordingly, facility management computing platform 110 may monitor such transactional activity, and determine patterns of such activities.

In some embodiments, the one or more attributes may include an event that may impact the operation of the enterprise facility. For example, facility management computing platform 110 may retrieve, from one or more external sources of data, one or more events that may impact a volume of customer traffic, a volume of transactional activity, an ability of employees to access the enterprise facility, and so forth. As described herein, the enterprise facility may be located in a geographical area that may have experienced a weather related event (e.g., snowstorm, hurricane, tornado, volcanic eruption, floods, forest fires, and so forth), a public related event, a civic unrest, a political upheaval, and so forth. Generally, such events may disrupt the enterprise facility's ability to provide effective customer service. In some embodiments, the one or more external sources of data may be artificial intelligence based systems. In some embodiments, the event may include one or more of: a weather-related event, a public health related event, a natural disaster related event, a security related event, an availability of internet resources, and availability of utility resources, a traffic related event. For example, facility management computing platform 110 may extract data from external data sources, determine anticipated customer traffic based on such data, for banking activity, trading activity, mortgage activity, and so forth.

At step 202, facility management computing platform 110 may identify, via the computing device and based on the one or more attributes, a business operation rule for the enterprise facility. A business operation rule may generally be operation and/or management guidelines applicable to an enterprise facility. For example, the business operation rule may include parameters for a security infrastructure (e.g., a number of security personnel, locations for security personnel, hours of operation, and so forth). As another example, the business operation rule may include parameters for a utility infrastructure (e.g., minimum bandwidth for internet activities, electrical power sources, heating and/or cooling facilities, backup power, availability of drinking water, sanitation facilities, and so forth). Also, for example, the business operation rule may include parameters for employees at the enterprise facility (e.g., are helmets required, are masks required, is eye protection required, biometric authentication rules, and so forth). As another example, the business operation rule may include parameters for customer interaction (e.g., customer wait times to provide various services, types of services available at the enterprise facility, and so forth).

In some embodiments, facility management computing platform 110 may determine wait times based on historical data on customer traffic. For example, facility management computing platform 110 may retrieve historical data from an enterprise data storage platform (e.g., enterprise data storage platform 130), and analyze such historical data to determine that at a given time during the day, there are more customers interacting with bank tellers, than with a mortgage loan consultant. Also, for example, facility management computing platform 110 may determine that when the Federal Reserve announces a reduction in interest rates, a volume of mortgage loan related activities may increase significantly. As another example, facility management computing platform 110 may determine that after a severe weather related event, a volume of customer traffic at an enterprise facility may decrease significantly. Additional and/or alternate types of user traffic may be analyzed to determine wait times.

At step 203, facility management computing platform 110 may determine, via the computing device and based on the one or more attributes and the business operation rule, an operational parameter for the enterprise facility. An operational parameter may generally refer to a parameter that may be deemed somewhat significant to effectively maintain operations at an enterprise facility. For example, the one or more attributes may include a number of employees performing specific functions, such as, for example, information technology infrastructure support personnel, bank tellers, security personnel, mortgage specialists, financial managers, trade experts, and so forth. Also, for example, the business operation rule may include parameters for customer interaction (e.g., wait times to provide various services, types of services available, and so forth). Accordingly, facility management computing platform 110 may analyze the one or more attributes and the business operation rule to determine the operational parameter to be the number of employees performing each function. In some embodiments, facility management computing platform 110 may analyze the one or more attributes and the business operation rule to determine the operational parameter to be an aggregate, or a weighted aggregate, of the number of employees performing each function. Also, for example, facility management computing platform 110 may analyze the one or more attributes and the business operation rule to determine the operational parameter to be the number of employees performing each function.

In some examples, facility management computing platform 110 may analyze the one or more attributes (e.g., size and location of the enterprise facility, whether the facility is shared with other businesses, and so forth) and the business operation rule (e.g., a type of security needed based on types of services available) to determine the operational parameter based on parameters for a security infrastructure (e.g., a number of security personnel, locations for security personnel, hours of operation, and so forth) for the number of employees present, or predicted to be present at the enterprise facility. As another example, facility management computing platform 110 may analyze the one or more attributes (e.g., size and location of the facility, types of services available, a number of customer service agents available) and the business operation rule (e.g., average target wait times for customers) to determine the operational parameter based on parameters for a security infrastructure for an expected volume of customer traffic. In some examples, facility management computing platform 110 may analyze the one or more attributes (e.g., estimated volume of online customer traffic) and the business operation rule (e.g., a number of online services to be offered, whether the services are offered on a 24-hour cycle) to determine the operational parameter to be a number of remote employees temporarily unable to connect via a remote internet connection. In some examples, facility management computing platform 110 may analyze the one or more attributes (e.g., total number of employees at the facility) and the business operation rule (e.g., staffing requirements for weekends, staffing requirements for an end of quarter reporting, customer traffic redirected form closure of another facility, public safety or public health requirements) to determine the operational parameter to be a number of employees that may be unable to be physically present at the enterprise facility (e.g., due to school closures, street closures, public transportation related disruptions and/or delays, weather related disruptions and/or delays, public health related factors, and so forth).

In some embodiments, facility management computing platform 110 may determine location data of one or more personnel associated with the enterprise facility, where the one or more personnel may be impacted by the event. For example, facility management computing platform 110 may access location data of the one or more personnel from a repository (e.g., enterprise data storage platform 130). The location data may include an address, GPS coordinates, location data from a 5G network device, an IP address of an enterprise computing device, and so forth. Generally, the location data may be anonymized and/or aggregated to provide a geographic distribution of the employees. In some embodiments, facility management computing platform 110 may provide the location data on a viewable interactive map. For example, the interactive map may display the location data as a distribution (e.g., a scatter plot).

Various events may impact the one or more personnel of an enterprise organization. For example, school closures, street closures, public transportation related disruptions and/or delays, weather related disruptions and/or delays, public health related factors, family leave, short or long term disabilities, and so forth may impact the one or more personnel. For example, schools may be closed and some employees may have to stay home to provide child care, and/or engage third parties to provide child care services. As another example, street closures may be caused due to a visiting very important person (VIP), a large traffic accident, road construction, a public event, a civic unrest, and so forth. Such street closures may cause certain personnel to not be able to commute to the enterprise facility. In some instances, the street closures may make the enterprise facility inaccessible.

Also, for example, public transportation related disruptions and/or delays may occur. For example, local trains may be delayed, certain sections of the rail system may be temporarily closed, buses may be re-routed or certain routes may be canceled. As another example, weather related disruptions and/or delays may occur. For example, a severe thunderstorm may cause damage to power lines, telecommunication cables, water supplies, and so forth. In some instances, heavy rainfall may cause floods. Also, for example, a severe winter storm may cause roadways and public transportation to be closed, and/or cause dangerous road conditions. Also, for example, a public health even may occur that may cause a number of personnel and/or members of their families to become sick.

Accordingly, facility management computing platform 110 may determine the operational parameter based on the location data of the one or more personnel. For example, facility management computing platform 110 may overlay a map with location data of personnel with a geographic region impacted by the event. For example, areas impacted by traffic disruptions, weather related events, schools and/or school districts that may be closed, and so forth, may be displayed over the map displaying distribution of the personnel. Accordingly, facility management computing platform 110 may determine the operational parameter as an impact factor based on one or more overlay criteria. For example, a geographic region may include 80% of the personnel and 70% of the geographic region may be impacted by the event. Accordingly, facility management computing platform 110 may associate a high impact factor with the event. As another example, location data may indicate that 5% of the personnel are associated with location data within a flooded region. Accordingly, facility management computing platform 110 may associate a low impact factor with the event.

At step 204, facility management computing platform 110 may compare, via the computing device, the operational parameter to a threshold parameter, where the threshold parameter is indicative of whether to keep the enterprise facility open for business. Generally, the threshold parameter may be indicative of optimal resources (e.g., equipment, human resources, network resources, and so forth) that may be needed to keep an enterprise facility operational. For example, the threshold parameter may be an optimal number of employees required to perform specific functions, such as, for example, information technology infrastructure support personnel, bank tellers, security personnel, mortgage specialists, financial managers, trade experts, and so forth. Accordingly, facility management computing platform 110 may compare an actual number of employees required to perform specific functions to the optimal number of employees required to perform the specific functions.

As another example, the threshold parameter may be an optimal number of security personnel needed, specific locations for security personnel to be deployed, hours of operation and types of security needs, and so forth. Accordingly, facility management computing platform 110 may compare an actual number of security personnel deployed to the optimal number of security personnel needed. Also, for example, the threshold parameter may be an optimal volume of customer traffic, an optimal number of online services to be offered, core services to be offered on a 24-hour cycle, optimal staffing requirements for weekends, optimal staffing requirements for an end of quarter reporting, optimal customer traffic that may be redirected form closure of another facility, optimal public safety or public health requirements. Accordingly, facility management computing platform 110 may compare an actual volume of customer traffic to the optimal volume of customer traffic, an actual number of online services to be offered to the optimal number of online services to be offered, actual staffing requirements for weekends to the optimal staffing requirements for weekends, actual staffing requirements for an end of quarter reporting to the optimal staffing requirements for an end of quarter reporting, actual customer traffic that may be redirected form closure of another facility to the optimal customer traffic that may be redirected form closure of another facility, actual public safety or public health requirements to the optimal public safety or public health requirements to the optimal volume of customer traffic, and so forth.

In some embodiments, the one or more attributes may include a volume of customer traffic at the enterprise facility, and where the threshold parameter may be an optimal volume of the customer traffic. For example, facility management computing platform 110 may determine estimates for the minimum volume of the customer traffic based on resources deployed. For example, the enterprise facility may be a banking facility that may include a bank teller, a mortgage center, a trading center and so forth. In some embodiments, facility management computing platform 110 may correlate a number of resources deployed (e.g., customer service agents, security personnel, cost of overheads, hours of operation, and so forth) to determine an optimal volume of the customer traffic that may be needed to keep the enterprise facility profitable, and the optimal number may be the threshold parameter.

In some embodiments, the one or more attributes may include a number of personnel at the enterprise facility, and where the threshold parameter may be an optimal number of the personnel needed to maintain the operation of the enterprise facility. For example, facility management computing platform 110 may determine estimates for the minimum number of the personnel needed based on, for example, resources deployed, and/or expected customer activity. For example, the enterprise facility may be a banking facility that may include a bank teller, a mortgage center, a trading center and so forth. In some embodiments, facility management computing platform 110 may determine an expected customer activity for one or more of these centers. For example, facility management computing platform 110 may determine an expected customer activity for the bank tellers, and may accordingly determine an optimal number of bank tellers needed to keep wait times at an optimal level. As another example, facility management computing platform 110 may determine an expected customer activity for the mortgage center, and may accordingly determine an optimal number of mortgage specialists needed to keep wait times at an optimal level.

In some embodiments, the one or more attributes may include a volume of transactional activity at the enterprise facility, and where the threshold parameter may be an optimal volume of the transactional activity. For example, facility management computing platform 110 may determine estimates for the optimal volume of the transactional activity based on, for example, resources deployed, historical transaction activity, and/or expected customer activity. For example, the enterprise facility may be a banking facility that may include a bank teller, a mortgage center, a trading center and so forth. In some embodiments, facility management computing platform 110 may determine the optimal volume of the transactional activity for one or more of these centers. For example, facility management computing platform 110 may determine an expected customer activity for the bank tellers, and may accordingly determine the optimal volume of the transactional activity. As another example, facility management computing platform 110 may determine an expected customer activity for the mortgage center, and may accordingly determine the optimal volume of the transactional activity.

In some embodiments, the one or more attributes may include an event, and where the threshold parameter may be based on a probability of occurrence of the event. For example, the event may be a weather related event, such as a hurricane, and facility management computing platform 110 may determine the threshold parameter to be a probability that the event occurs with a probability of 0.7. In some embodiments, facility management computing platform 110 may access one or more external data sources (e.g., a weather service database) to monitor weather related events, and track the probability of occurrence of such events. For example, when a category of a hurricane is modified, facility management computing platform 110 may adjust the probability of occurrence. As another example, the event may be a public safety related event, such as a demonstration, and facility management computing platform 110 may determine the threshold parameter to be a probability that the event occurs with a probability of 0.9. In some embodiments, facility management computing platform 110 may access one or more external data sources (e.g., a news database, a local government database, and so forth) to monitor public safety related events, and track the probability of occurrence of such events. For example, when a demonstration, a traffic disruption, a civic unrest, and so forth is likely to occur, facility management computing platform 110 may adjust the probability of occurrence based on such likelihood.

Referring to FIG. 2B, at step 205, facility management computing platform 110 may, upon a determination that the operational parameter fails to exceed the threshold parameter, determine, via the computing device, to temporarily close the enterprise facility. For example, facility management computing platform 110 may determine that the actual number of employees required to perform specific functions fails to exceed the optimal number of employees required to perform the specific functions, and may determine to temporarily close the enterprise facility. As another example, facility management computing platform 110 may determine that the actual number of security personnel deployed fails to exceed the optimal number of security personnel needed, and may determine to temporarily close the enterprise facility. Similarly, facility management computing platform 110 may determine that the actual volume of customer traffic fails to exceed the optimal volume of customer traffic, the actual number of online services to be offered fails to exceed the optimal number of online services to be offered, the actual staffing requirements for weekends fails to exceed the optimal staffing requirements for weekends, the actual staffing requirements for an end of quarter reporting fails to exceed the optimal staffing requirements for an end of quarter reporting, the actual customer traffic that may be redirected form closure of another facility fails to exceed the optimal customer traffic that may be redirected form closure of another facility, the actual public safety or public health requirements fails to exceed the optimal public safety or public health requirements to the optimal volume of customer traffic, and so forth, and facility management computing platform 110 may determine to temporarily close the enterprise facility.

Also, for example, facility management computing platform 110 may determine that the impact factor for an event is higher than the threshold parameter for the event, and may determine to temporarily close the enterprise facility. For example, a geographic region may include 80% of the personnel employed at the enterprise facility, and 70% of the geographic region may be impacted by the event. Accordingly, facility management computing platform 110 may associate a high impact factor with the event. In some embodiments, the threshold parameter for the event may be "medium" and accordingly, based on a determination that the event with the high impact factor exceeds the threshold parameter, facility management computing platform 110 may determine to temporarily close the enterprise facility. As another example, location data may indicate that 5% of the personnel employed at the enterprise facility are associated with location data within a flooded region. Accordingly, facility management computing platform 110 may associate a low impact factor with the event. In some embodiments, the threshold parameter for the event may be "medium" and accordingly, based on a determination that the event with the low impact factor does not exceed the threshold parameter, facility management computing platform 110 may determine not to temporarily close the enterprise facility.

In some embodiments, facility management computing platform 110 may determine that the actual volume of customer traffic at the enterprise facility fails to exceed the optimal volume of customer traffic at the enterprise facility, and may determine to temporarily close the enterprise facility. Also, for example, facility management computing platform 110 may determine that the actual number of personnel at the enterprise facility fails to exceed the optimal number of personnel at the enterprise facility, and may determine to temporarily close the enterprise facility. As another example, facility management computing platform 110 may determine that the actual volume of transactional activity at the enterprise facility fails to exceed the optimal volume of transactional activity at the enterprise facility, and may determine to temporarily close the enterprise facility.

In some embodiments, facility management computing platform 110 may determine that the probability of occurrence of the event fails to exceed the probability of occurrence of the event, and may determine to temporarily close the enterprise facility. For example, the event may be a weather related event, such as a hurricane, and facility management computing platform 110 may determine the event may occur with a probability of 0.7. Accordingly, a probability of non-occurrence of the event may be determined to be 0.3 which may fail to exceed the threshold parameter of 0.4 for non-occurrence of the event. Accordingly, facility management computing platform 110 may determine to temporarily close the enterprise facility.

In some embodiments, the computing platform may train, based on historical data associated with opening or closing of enterprise facilities, a machine learning model to determine whether to temporarily close the enterprise facility. For example, based on historical data, the machine learning model may be trained to correlate the one or more attributes, the business operation rules, the operational parameters and threshold parameters, with the decision to open or close the enterprise facility. Also, for example, the machine learning model may be trained to detect patterns of types of transactions that may be managed by the enterprise facilities. Various unsupervised learning models may be utilized to detect such patterns. For example, a K-means clustering model, a medoid clustering model, and so forth may be utilized to train the machine learning model. Subsequently, the computing platform may apply the trained machine learning model to determine threshold parameters, and/or decide whether to open or close the enterprise facility.

In some embodiments, facility management computing platform 110 may train a machine learning model to route the customer queries. For example, facility management computing platform 110 may train the machine learning model to predict a volume of customer traffic. For example, during an emergency, the machine learning model may predict a higher volume of queries related to banking. As another example, when interest rates decline, the machine learning model may predict a higher volume of queries related to refinancing options, mortgage options for a new home purchase, and so forth. Accordingly, the machine learning model may predict resources that may be needed to meet an increased or decreased customer demand. For example, facility management computing platform 110 may allocate call center resources based on predictions made by the machine learning model. In some embodiments, the machine learning model may be configured to utilize an appropriate constrained optimization algorithm to optimize available resources. Accordingly, the machine learning model may compare the operational parameters to the threshold parameters for enterprise facilities to decide to open or close one or more such enterprise facilities.

In some embodiments, the machine learning model may be based on reinforced learning. For example, facility management computing platform 110 may correlate decisions to open or close facilities and an impact of such decisions on a flow of customer traffic, a volume of transactional activity, retention of customers, customer satisfaction parameters, and so forth. For example, certain decisions to open an enterprise facility may result in reduced wait times, optimized available resources, and/or increased customer satisfaction. Accordingly, facility management computing platform 110 may positively reinforce such decisions based on associated configurations. As another example, certain service centers may be more effective in resolving certain issues, and facility management computing platform 110 may positively reinforce redirection to such service centers for such issues.

In some embodiments, facility management computing platform 110 may integrate with one or more external artificial intelligence (AI) systems to retrieve information related to events. Such AI systems may include, for example, a weather system, a news analysis system, a stock market analysis system, a virtual assistant associated with mobile devices, a consumer behavior analysis system, an email analysis system, and so forth.

Generally, facility management computing platform 110 may utilize the AI system to receive the one or more attributes of an event. In some embodiments, facility management computing platform 110 may proactively message customers to provide updates about anticipated facility closures, wait times, account activity, account balance, and so forth. In some embodiments, such messages may be sent via a virtual assistant based on a natural language processing system. For example, such messages may be sent via an SMS service, and may assume that the customer has an optimal level of internet connectivity. In some embodiments, the virtual assistant may interact with the customer via a telephone, a personal computer, a mobile device, a video link, and so forth. Also, for example, the virtual assistant may be configured to interact with the customer via a variety of channels, operating systems, natural languages, and so forth.

At step 206, facility management computing platform 110 may redistribute, via the computing device, user traffic to one or more open customer resource facilities. For example, upon a determination to close an enterprise facility, facility management computing platform 110 may identify alternate physical and/or virtual facilities that may serve the customers. In some embodiments, facility management computing platform 110 may determine a customer's location, and/or a type of service desired, to redirect the customer to an appropriate alternate resource. Such resources may be allocated dynamically. In some embodiments, facility management computing platform 110 may automatically re-schedule customer appointments at the alternate facilities.

In some embodiments, facility management computing platform 110 may train, based on historical data associated with opening or closing of enterprise facilities, a machine learning model to redistribute the user traffic to the one or more open customer resource facilities. For example, facility management computing platform 110 may determine an optimal redistribution of customers based on historical data on customer allocation. For example, historical data of closing a facility may indicate that a first customer who was reallocated to a first enterprise facility, actually visited the first enterprise facility. Accordingly, facility management computing platform 110 may train the machine learning model to allocate the first customer to the first enterprise facility. Also, for example, historical data of closing a facility may indicate that a second customer who was reallocated to the first enterprise facility, actually visited a second enterprise facility. Accordingly, facility management computing platform 110 may train the machine learning model to allocate the second customer to the second enterprise facility. As another example, historical data of closing a facility may indicate that a third customer who was reallocated to the second enterprise facility, actually visited a virtual facility. Accordingly, facility management computing platform 110 may train the machine learning model to allocate the third customer to the virtual enterprise facility.

As another example, historical data of closing a facility may indicate that a customer may typically keep the automated appointment scheduled by the facility management computing platform 110. Accordingly, facility management computing platform 110 may train the machine learning model to automatically reschedule the appointment of the customer. In some embodiments, historical data of closing a facility may indicate that a customer may typically change the automated appointment scheduled by the facility management computing platform 110. Accordingly, facility management computing platform 110 may train the machine learning model to update a manner in which the scheduled appointment is modified by the customer, and automatically reschedule the appointment of the customer based on such predicted modifications.

In some embodiments, facility management computing platform 110 may trigger, via the computing device, a business continuity plan for the enterprise facility. For example, the enterprise facility may have a business continuity plan that describes plans, protocols, and/or procedures to be followed when an event occurs. For example, the business continuity plan may indicate how backup power resources may be utilized in the event of a loss of a source of electrical power. As another example, the business continuity plan may indicate backup computing infrastructure that may be utilized in the event of a security breach. As another example, the business continuity plan may include communication protocols (e.g., send notifications via emails, text messages, telephone calls, and so forth), security protocols, health and safety protocols (e.g., personnel have to wear facial coverings when using elevators, employees need to wash their hands with soap and warm water, and so forth). Accordingly, facility management computing platform 110 may trigger the business continuity plan. For example, facility management computing platform 110 may alert one or more security personnel, managers, and so forth, to trigger the business continuity plan.

Generally, market leaders may need to be aware of not only if an enterprise facility has to be temporarily closed, but may also need to know how many days the closure may last for, how many customers and/or services may be impacted, and so forth, so that the market leaders may deploy resources (e.g., members on their team) to begin executing the business continuity plan. For example, facility management computing platform 110 may determine to close the enterprise facility for a week, and accordingly, all of the appointments scheduled during the week may need to be rescheduled. Accordingly, the market leader may review the decisions and ensure that appropriate business continuity plans are executed.

In some embodiments, the computing platform may receive, via the computing device, one or more additional attributes associated with the operation of the enterprise facility. For example, facility management computing platform 110 may monitor the one or more attributes to detect changes. For example, the weather related event may have already occurred, the public transportation system may have returned to a normal schedule, the power resources may have been restored, the security related event may have been managed, and so forth. Accordingly, facility management computing platform 110 may determine, via the computing device and based on the one or more additional attributes and the business operation rule, a second operational parameter for the enterprise facility. For example, waters may have subsided in a flood zone, and the number of affected employees may have decreased. As another example, the security threat to computing infrastructure may have been managed, and an appropriate level of resources may be available.

Subsequently, facility management computing platform 110 may compare, via the computing device, the second operational parameter to the threshold parameter. Then, the computing platform may, upon a determination that the second operational parameter exceeds the threshold parameter, determine, via the computing device, to open the enterprise facility. For example, facility management computing platform 110 may determine that the actual number of employees required to perform specific functions exceeds the optimal number of employees required to perform the specific functions, and may determine to open the enterprise facility. As another example, facility management computing platform 110 may determine that the actual number of security personnel deployed exceeds the optimal number of security personnel needed, and may determine to open the enterprise facility. Similarly, facility management computing platform 110 may determine that the actual volume of customer traffic exceeds the optimal volume of customer traffic, the actual number of online services to be offered exceeds the optimal number of online services to be offered, the actual staffing requirements for weekends exceeds the optimal staffing requirements for weekends, the actual staffing requirements for an end of quarter reporting exceeds the optimal staffing requirements for an end of quarter reporting, the actual customer traffic that may be redirected form closure of another facility exceeds the optimal customer traffic that may be redirected form closure of another facility, the actual public safety or public health requirements exceeds the optimal public safety or public health requirements to the optimal volume of customer traffic, and so forth, and facility management computing platform 110 may determine to open the enterprise facility.

Also, for example, facility management computing platform 110 may determine that the impact factor for an event is lower than the threshold parameter for the event, and may determine to open the enterprise facility. For example, a geographic region may include 80% of the personnel employed at the enterprise facility, and 20% of the geographic region may be impacted by the event. Accordingly, facility management computing platform 110 may associate a low impact factor with the event. In some embodiments, the threshold parameter for the event may be "medium" and accordingly, based on a determination that the event with the low impact factor does not exceed the threshold parameter, facility management computing platform 110 may determine to open the enterprise facility. As another example, location data may indicate that 85% of the personnel employed at the enterprise facility are associated with location data within a flooded region. Additional data may indicate that the flood waters may have subsided, and roads and infrastructure have been restored. Accordingly, facility management computing platform 110 may associate a low impact factor with the event. In some embodiments, the threshold parameter for the event may be "medium" and accordingly, based on a determination that the event with the low impact factor does not exceed the threshold parameter, facility management computing platform 110 may determine to open the enterprise facility.

In some embodiments, facility management computing platform 110 may determine that the actual volume of customer traffic at the enterprise facility exceeds the optimal volume of customer traffic at the enterprise facility, and may determine to open the enterprise facility. Also, for example, facility management computing platform 110 may determine that the actual number of personnel at the enterprise facility exceeds the optimal number of personnel at the enterprise facility, and may determine to open the enterprise facility. As another example, facility management computing platform 110 may determine that the actual volume of transactional activity at the enterprise facility exceeds the optimal volume of transactional activity at the enterprise facility, and may determine to open the enterprise facility. In some embodiments, facility management computing platform 110 may determine that the probability of occurrence of the event exceeds the probability of occurrence of the event, and may determine to open the enterprise facility.

Figure 3:
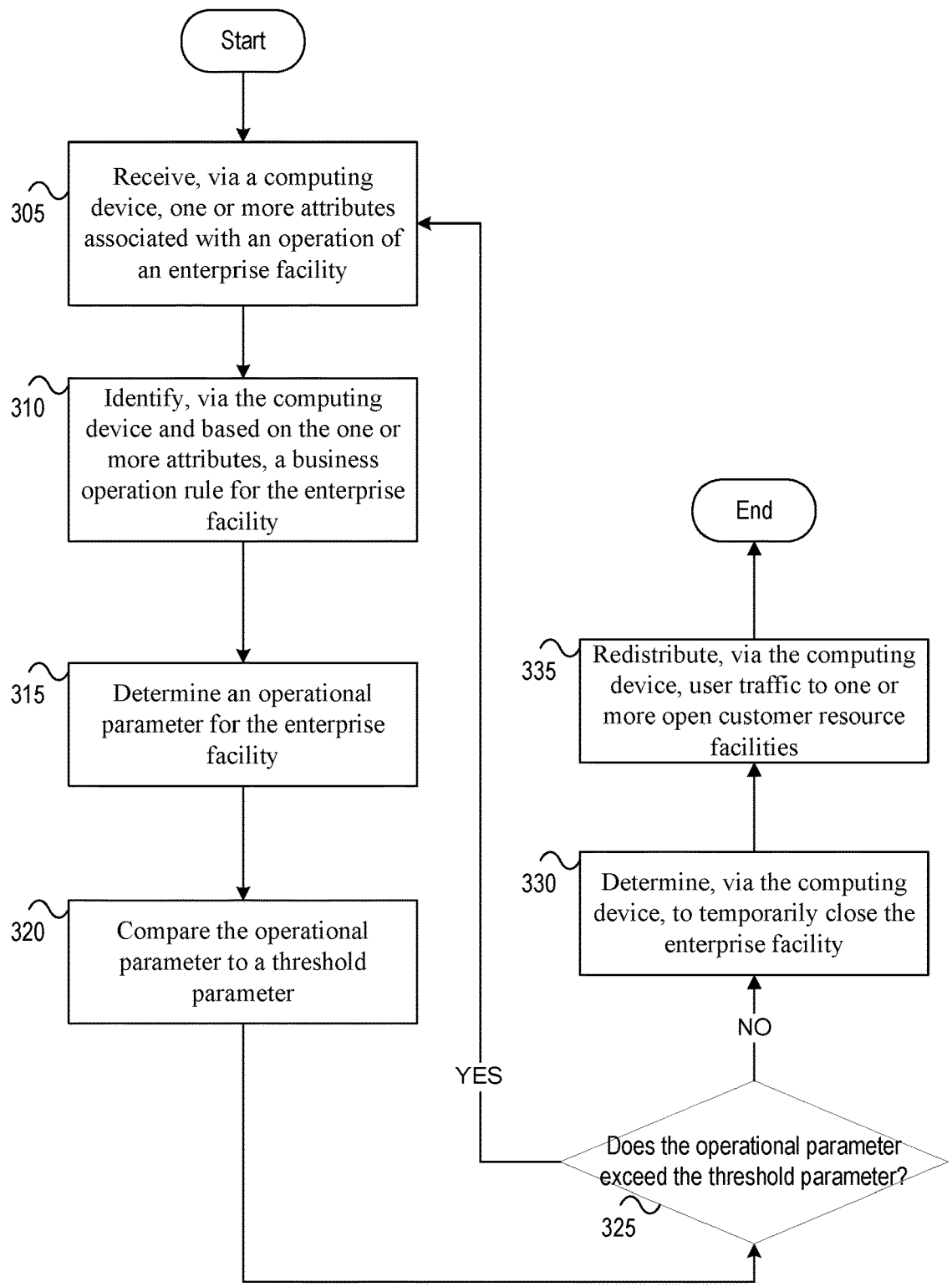
FIG. 3 depicts an illustrative method for machine learning based decision model to open and close enterprise facilities.

FIG. 3 depicts an illustrative method for a decision model to open and close enterprise facilities. Referring to FIG. 3, at step 305, facility management computing platform 110 having at least one processor, and memory may receive, via a computing device, one or more attributes associated with an operation of an enterprise facility. At step 310, facility management computing platform 110 may identify, via the computing device and based on the one or more attributes, a business operation rule for the enterprise facility. At step 315, facility management computing platform 110 may determine, via the computing device and based on the one or more attributes and the business operation rule, an operational parameter for the enterprise facility. At step 320, facility management computing platform 110 may compare, via the computing device, the operational parameter to a threshold parameter, where the threshold parameter is indicative of whether to keep the enterprise facility open for business.

At step 325, facility management computing platform 110 may determine whether the operational parameter exceeds the threshold parameter. Upon a determination that the operational parameter exceeds the threshold parameter, the process may return to step 305. Upon a determination that the operational parameter fails to exceed the threshold parameter, the process may proceed to step 330. At step 330, facility management computing platform 110 may determine, via the computing device, to temporarily close the enterprise facility. At step 335, facility management computing platform 110 may redistribute, via the computing device, user traffic to one or more open customer resource facilities.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor; and
memory storing computer-readable instructions that, when executed by the at least one processor, cause the computing platform to:
update, based on historical data associated with opening or closing of enterprise facilities, a machine learning model to determine whether to temporarily close the enterprise facilities;
receive, via a computing device, an indication that a weather related event will impact operation of an enterprise facility;
identify, via the computing device, a number of employees performing services at the enterprise facility;
access location data corresponding to physical locations of the employees, wherein the location data is anonymized and aggregated to provide a geographic distribution of the employees;
determine, via the computing device, using the machine learning model, and based on an occurrence of the weather related event, a first subset of the employees that will be unable to be physically present at the enterprise facility, wherein determining the first subset of the employees will be unable to be physically present at the enterprise facility comprises automatically overlaying a map of the location data on a geographic region affected by the occurrence of the weather related event;
compare, via the computing device and based on the first subset of the employees that will be unable to be physically present at the enterprise facility, a second subset of the employees that will be able to be physically present at the enterprise facility to a threshold number of employees whose physical presence is needed to keep the enterprise facility open for business;
upon a determination that the second subset of the employees that will be able to be physically present at the enterprise facility fails to exceed the threshold number of employees whose physical presence is needed to keep the enterprise facility open for business, automatically determine, via the computing device and using the machine learning model, to temporarily close the enterprise facility;
redistribute, via the computing device and in real time based on the automated machine learning determination to temporarily close the enterprise facility, user traffic from the enterprise facility to a virtual facility, wherein the virtual facility is configured to perform the services;
initiate, based on the determination to temporarily close the enterprise facility, a continuity plan, wherein initiating the continuity plan includes instructing:
one or more scheduling systems to shift appointments for the enterprise facility to a different enterprise facility, wherein instructing the one or more scheduling systems to shift the appointments for the enterprise facility causes the one or more scheduling systems to shift the appointments for the enterprise facility, and
one or more backup power systems to supply power to the enterprise facility, wherein instructing the one or more backup power systems to supply the power to the enterprise facility causes the one or more backup power systems to supply the power to the enterprise facility;
automatically identify, using the automated map overlay of the location data on the geographic region affected by the occurrence of the weather related event that a third subset of the employees, larger than the second subset of the employees, will now be able to be physically present at the enterprise facility, wherein automatically identifying the third subset of the employees comprises displaying the location data on a graphical user interface;
compare, via the computing device, the third subset of the employees that will be able to be physically present at the enterprise facility to the threshold number of employees whose physical presence is needed to keep the enterprise facility open for business; and in response to a determination that the third subset of the employees that will be able to be physically present at the enterprise facility exceeds the threshold number of employees whose physical presence is needed to keep the enterprise facility open for business, automatically determine, via the computing device and in real time, to reopen the enterprise facility.

2. The computing platform of claim 1, wherein the instructions comprise additional computer-readable instructions that, when executed by the at least one processor, cause the computing platform to:
receive, via the computing device, one or more additional attributes associated with the operation of the enterprise facility;
determine, via the computing device and based on the one or more additional attributes and a business operation rule, a second operational parameter for the enterprise facility;
compare, via the computing device, the second operational parameter to a threshold parameter; and
upon a determination that the second operational parameter exceeds the threshold parameter, determine, via the computing device, to open the enterprise facility.

3. The computing platform of claim 1, wherein the threshold number of employees whose physical presence is needed to keep the enterprise facility open for business comprises an optimal number of personnel needed to maintain the operation of the enterprise facility.

4. The computing platform of claim 1, wherein the instructions comprise additional computer-readable instructions that, when executed by the at least one processor, cause the computing platform to:
identify a probability of occurrence of the weather related event; and
compare the probability of occurrence of the weather related event to a threshold probability, wherein determining to temporarily close the enterprise facility is further based on a determination that the probability of occurrence of the weather related event exceeds the threshold probability.

5. The computing platform of claim 4, wherein the instructions comprise additional computer-readable instructions that, when executed by the at least one processor, cause the computing platform to:
determine the probability of occurrence of the weather related event based on the identified weather related event.

6. The computing platform of claim 4, wherein the instructions comprise additional computer-readable instructions that, when executed by the at least one processor, cause the computing platform to:
determine location data of one or more personnel associated with the enterprise facility, wherein the one or more personnel may be impacted by the event; and
determine the probability of occurrence of the weather related event based on the location data of the one or more personnel.

7. The computing platform of claim 4, wherein the instructions comprise additional computer-readable instructions that, when executed by the at least one processor, cause the computing platform to:
identify one or more of: a public health related event, a natural disaster related event, a security related event, an availability of internet resources, and availability of utility resources, a traffic related event.

8. The computing platform of claim 1, wherein the instructions comprise additional computer-readable instructions that, when executed by the at least one processor, cause the computing platform to:
identify a volume of customer traffic at the enterprise facility; and
compare the volume of customer traffic at the enterprise facility to an optimal volume threshold, wherein determining to temporarily close the enterprise facility is further based on a determination that the volume of customer traffic at the enterprise facility does not exceed the optimal volume threshold.

9. The computing platform of claim 1, wherein the instructions comprise additional computer-readable instructions that, when executed by the at least one processor, cause the computing platform to:
identify a volume of transactional activity at the enterprise facility; and
compare the volume of transactional activity to a transactional activity threshold, wherein determining to temporarily close the enterprise facility is further based on a determination that the volume of transactional activity does not exceed the transactional activity threshold.

10. The computing platform of claim 1, wherein the enterprise facility comprises a different virtual facility.

11. The computing platform of claim 1, wherein the instructions comprise additional computer-readable instructions that, when executed by the at least one processor, cause the computing platform to:
automatically re-schedule user appointments.

12. The computing platform of claim 1, wherein the instructions comprise additional computer-readable instructions that, when executed by the at least one processor, cause the computing platform to:
determine location data of one or more customers associated with the enterprise facility; and
redistribute the user traffic based on the location data.

13. The computing platform of claim 1, wherein the instructions comprise additional computer-readable instructions that, when executed by the at least one processor, cause the computing platform to:
train, based on historical data associated with opening or closing of enterprise facilities, the machine learning model to determine whether to temporarily close the enterprise facility.

14. The computing platform of claim 1, wherein the instructions comprise additional computer-readable instructions that, when executed by the at least one processor, cause the computing platform to:
train, based on historical data associated with opening or closing of enterprise facilities, the machine learning model to redistribute the user traffic to the one or more open customer resource facilities.

15. A method, comprising:
at a computing platform comprising at least one processor, and memory:
updating, based on historical data associated with opening or closing of enterprise facilities, a machine learning model to determine whether to temporarily close the enterprise facility;
receiving, via a computing device, an indication that a weather related event will impact an operation of an enterprise facility;
identifying, via the computing device, a number of employees performing services at the enterprise facility;

access location data corresponding to physical locations of the employees, wherein the location data is anonymized and aggregated to provide a geographic distribution of the employees;

determining, via the computing device, using the machine learning model, and based on an occurrence of the weather related event, a first subset of the employees that will be unable to be physically present at the enterprise facility, wherein determining the first subset of the employees will be unable to be physically present at the enterprise facility comprises automatically overlaying a map of the location data on a geographic region affected by the occurrence of the weather related event;

comparing, via the computing device and based on the first subset of the employees that will be unable to be physically present at the enterprise facility, a second subset of the employees that will be able to be physically present at the enterprise facility to a threshold number of employees whose physical presence is needed to keep the enterprise facility open for business;

upon a determination that the second subset of the employees that will be able to be physically present at the enterprise facility fails to exceed the threshold number of employees whose physical presence is needed to keep the enterprise facility open for business, automatically determining, via the computing device and using the machine learning model, to temporarily close the enterprise facility;

redistributing, via the computing device and in real time based on the automated machine learning determination to temporarily close the enterprise facility, user traffic from the enterprise facility to a virtual facility, wherein the virtual facility is configured to perform the services;

initiating, based on the determination to temporarily close the enterprise facility, a continuity plan, wherein initiating the continuity plan includes instructing:
  one or more scheduling systems to shift appointments for the enterprise facility to a different enterprise facility, wherein instructing the one or more scheduling systems to shift the appointments for the enterprise facility causes the one or more scheduling systems to shift the appointments for the enterprise facility, and
  one or more backup power systems to supply power to the enterprise facility, wherein instructing the one or more backup power systems to supply the power to the enterprise facility causes the one or more backup power systems to supply the power to the enterprise facility;

automatically identifying, using the automated map overlay of the location data on the geographic region affected by the occurrence of the weather related event that a third subset of the employees, larger than the second subset of the employees, will now be able to be physically present at the enterprise facility, wherein automatically identifying the third subset of the employees comprises displaying the location data on a graphical user interface;

comparing, via the computing device, the third subset of the employees that will be able to be physically present at the enterprise facility to the threshold number of employees whose physical presence is needed to keep the enterprise facility open for business; and in response to a determination that the third subset of the employees that will be able to be physically present at the enterprise facility exceeds the threshold number of employees whose physical presence is needed to keep the enterprise facility open for business, automatically determining, via the computing device and in real time, to reopen the enterprise facility.

16. The method of claim 15, further comprising:
receiving, via the computing device, one or more additional attributes associated with the operation of the enterprise facility;
determining, via the computing device and based on the one or more additional attributes and a business operation rule, a second operational parameter for the enterprise facility;
comparing, via the computing device, the second operational parameter to a threshold parameter; and
upon a determination that the second operational parameter exceeds the threshold parameter, determining, via the computing device, to open the enterprise facility.

17. The method of claim 15, further comprising:
training, based on historical data associated with opening or closing of enterprise facilities, the machine learning model to determine whether to temporarily close the enterprise facility.

18. The method of claim 15, wherein the enterprise facility comprises a different virtual facility.

19. One or more non-transitory computer-readable media storing instructions that, when executed by a computing platform comprising at least one processor, and memory, cause the computing platform to:
update, based on historical data associated with opening or closing of enterprise facilities, a machine learning model to determine whether to temporarily close the enterprise facility;
receive, via a computing device, an indication that a weather related event will impact operation of an enterprise facility;
identify, via the computing device, a number of employees performing services at the enterprise facility;
access location data corresponding to physical locations of the employees, wherein the location data is anonymized and aggregated to provide a geographic distribution of the employees;
determine, via the computing device, using the machine learning model, and based on an occurrence of the weather related event, a first subset of the employees that will be unable to be physically present at the enterprise facility, wherein determining the first subset of the employees will be unable to be physically present at the enterprise facility comprises automatically overlaying a map of the location data on a geographic region affected by the occurrence of the weather related event;
compare, via the computing device and based on the first subset of the employees that will be unable to be physically present at the enterprise facility, a second subset of the employees that will be able to be physically present at the enterprise facility to a threshold number of employees whose physical presence is needed to keep the enterprise facility open for business;
upon a determination that the second subset of the employees that will be able to be physically present at the enterprise facility fails to exceed the threshold number of employees whose physical presence is needed to keep the enterprise facility open for business, automatically determine, via the computing device and using the machine learning model, to temporarily close the enterprise facility;

redistribute, via the computing device and in real time based on the automated machine learning determination to temporarily close the enterprise facility, user traffic from the enterprise facility to a virtual facility, wherein the virtual facility is configured to perform the services;

initiate, based on the determination to temporarily close the enterprise facility, a continuity plan, wherein initiating the continuity plan includes instructing:
- one or more scheduling systems to shift appointments for the enterprise facility to a different enterprise facility, wherein instructing the one or more scheduling systems to shift the appointments for the enterprise facility causes the one or more scheduling systems to shift the appointments for the enterprise facility, and
- one or more backup power systems to supply power to the enterprise facility, wherein instructing the one or more backup power systems to supply the power to the enterprise facility causes the one or more backup power systems to supply the power to the enterprise facility;

automatically identify, using the automated map overlay of the location data on the geographic region affected by the occurrence of the weather related event that a third subset of the employees, larger than the second subset of the employees, will now be able to be physically present at the enterprise facility, wherein automatically identifying the third subset of the employees comprises displaying the location data on a graphical user interface;

compare, via the computing device, the third subset of the employees that will be able to be physically present at the enterprise facility to the threshold number of employees whose physical presence is needed to keep the enterprise facility open for business; and in response to a determination that the third subset of the employees that will be able to be physically present at the enterprise facility exceeds the threshold number of employees whose physical presence is needed to keep the enterprise facility open for business, automatically determine, via the computing device and in real time, to reopen the enterprise facility.

\* \* \* \* \*